US007798765B2

(12) United States Patent
Snyder et al.

(10) Patent No.: US 7,798,765 B2

(45) Date of Patent: Sep. 21, 2010

(54) OUT-FLOW MARGIN PROTECTION FOR A GAS TURBINE ENGINE

(75) Inventors: Timothy S. Snyder, Glastonbury, CT (US); Francisco J. Cunha, Avon, CT (US)

(73) Assignee: United Technologies Corporation, Hartford, CT (US)

( * ) Notice: Subject to any disclaimer, the term of this patent is extended or adjusted under 35 U.S.C. 154(b) by 831 days.

(21) Appl. No.: 11/786,672

(22) Filed: Apr. 12, 2007

(65) Prior Publication Data

US 2008/0253884 A1 Oct. 16, 2008

(51) Int. Cl.
*F01D 25/14* (2006.01)

(52) U.S. Cl. .......................................... 415/1; 415/116

(58) Field of Classification Search ................. 415/116, 415/108, 117

See application file for complete search history.

(56) References Cited

U.S. PATENT DOCUMENTS

| | | | | |
|---|---|---|---|---|
| 2,220,420 A | | 11/1940 | Meyer | |
| 2,489,683 A | | 11/1949 | Stalker | |
| 3,099,134 A | | 7/1963 | Calder et al. | |
| 4,302,947 A | | 12/1981 | Mueller et al. | |
| 4,347,037 A | | 8/1982 | Corrigan | |
| 4,705,455 A | | 11/1987 | Sahm et al. | |
| 4,891,936 A | | 1/1990 | Shekleton et al. | |
| 5,281,084 A | | 1/1994 | Noe et al. | |
| 5,388,960 A | * | 2/1995 | Suzuki et al. | 415/108 |
| RE34,962 E | | 6/1995 | Shekleton et al. | |
| 7,137,245 B2 | | 11/2006 | Graziosi et al. | |
| 2004/0228723 A1 | * | 11/2004 | Dittmann et al. | 415/117 |
| 2007/0012048 A1 | | 1/2007 | Buret et al. | |
| 2008/0164658 A1 | * | 7/2008 | Do | 277/355 |

* cited by examiner

*Primary Examiner*—Richard Edgar
(74) *Attorney, Agent, or Firm*—Kinney & Lange, P.A.

(57) ABSTRACT

A cooled turbine exhaust case assembly includes a plenum defined at least in part by a forward outer diameter flowpath ring and a turbine case, a probe positioned at a probe opening formed in the forward outer diameter flowpath ring, and an inlet opening in the turbine case for introducing cooling air to the plenum.

26 Claims, 3 Drawing Sheets

42
40
12
20
24
32
26
34
30
28
16
44
44
14
$C_L$

OUT-FLOW MARGIN PROTECTION FOR A GAS TURBINE ENGINE

STATEMENT OF GOVERNMENT INTEREST

The invention was made with Government support under N00019-02-C-3003 awarded by the United States Navy. The U.S. Government has certain rights in this invention.

BACKGROUND

The present invention relates to cooling gas turbine engine components, and more particularly, to cooling gas turbine engine components at or near exhaust system hot gas flowpaths.

Gas turbine engines generally include an exhaust system located at an aft end of the engine. These exhaust systems can include a turbine exhaust case (TEC) that is located aft of the turbine section or sections of the engine. In low-bypass ratio engines and engines for military applications, the TEC is important for straightening hot gas flow for an afterburner system (located aft of the TEC), for improving the engine's radar profile, etc. TEC assemblies generally include a forward outer diameter ring (FODR), located at a forward portion of the TEC, that defines a portion of a hot gas flowpath.

Probes (or sensors) may be positioned to extend through the FODR during engine testing and during regular flight cycles. These probes extend into the hot gas flowpath in order to gather desired data. Often, such probes are positioned in a hole defined through the FODR, and a boss assembly having a "slider" seal plate is positioned to seal a gap formed between the probe and the edges of the hole in the FODR. The slider seal plate can be retained by tabs located at a radially outer surface of the FODR.

Exhaust system components are often subject to adverse pressure gradients and high temperature levels during operation. Those conditions can lead to undesirable stress, wear and damage to engine components. Over time, this can lead to relatively short lifespans of affected components, and lead to significant expenditures of time, effort and money to repair or replace those affected components. In addition, inadequate pressurization of a FODR plenum at the hot gas flowpath can produce a negative pressure difference, and lead to undesirable inflow of hot gases into the FODR plenum at the slider seal plate of the boss assembly and other locations.

SUMMARY

A cooled turbine exhaust case assembly includes a plenum defined at least in part by a forward outer diameter flowpath ring and a turbine case, a probe positioned at a probe opening formed in the forward outer diameter flowpath ring, and an inlet opening in the turbine case for introducing cooling air to the plenum.

DETAILED DESCRIPTION

In general, the present invention provides a cooled turbine exhaust case (TEC) assembly for a gas turbine engine, and a method for cooling the same. The TEC includes a forward outer diameter ring (FODR) plenum into which a cooling gas is introduced. The cooling gas can be introduced to the FODR plenum through one or more cooling openings defined in a turbine case or optionally through a bent cooling sleeve assembly supported by the turbine case. The cooling gas can also be delivered to the FODR plenum at an angle in order to help avoid directly impinging cooling gas upon surfaces of the FODR, for example, where the cooling gas is delivered in a direction that is substantially tangential to an inner surface of the turbine case. In addition, one or more cooling holes can be defined in a forward region of the FODR for allowing cooling air to exit the FODR plenum to a hot gas flowpath of the engine in order to provide film cooling. The present invention provides a number of benefits that include reducing inflow of hot gases into the FODR plenum, providing effective film cooling to the FODR at a hot gas flowpath margin, attenuating pressure cyclic oscillations, and limiting thermal gradients in the FODR and turbine case. These benefits and others will be understood in conjunction with the more detailed discussion of the present invention that follows below.

Figure 1:
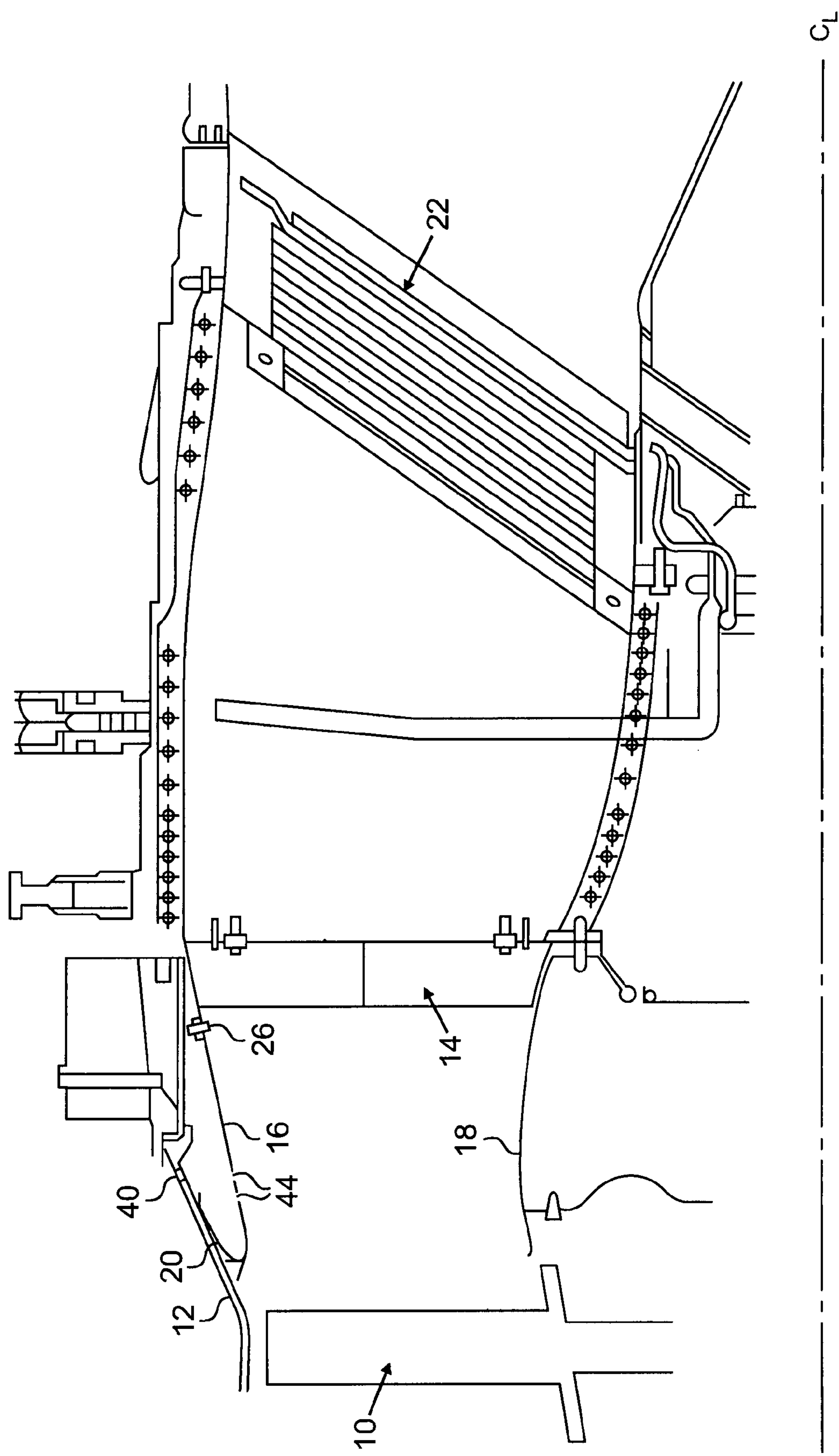
FIG. 1 is a schematic cross-sectional view of a portion of an aft section of a gas turbine engine according to the present invention.

FIG. 1 is a schematic cross-sectional view of a portion of an aft section of a gas turbine engine, and illustrates a portion of a low pressure turbine (LPT) section 10 having a LPT case 12, a turbine exhaust case (TEC) assembly 14 having a forward outer diameter ring (FODR) 16 and a forward inner diameter ring 18, a finger seal 20, and an afterburner assembly 22. The engine has a hot gas flowpath, and hot gases from the LPT section 10 can flow through the TEC assembly 14 and the afterburner assembly 22 along the hot gas flowpath. The hot gas flowpath has a generally annular shape defined about an engine centerline $C_L$. In the illustrated embodiment, a divergent portion of the hot gas flowpath is defined through the TEC assembly 14 between the FODR 16 and the forward inner diameter ring 18. The TEC assembly 14 can help straighten flow in the hot gas flowpath before reaching the afterburner assembly 22, help improve the engine's radar profile, and provide other known functionality. The basic operation of gas turbine engines is well known in the art, and therefore further discussion of such engine operation is unnecessary here.

Figure 2:
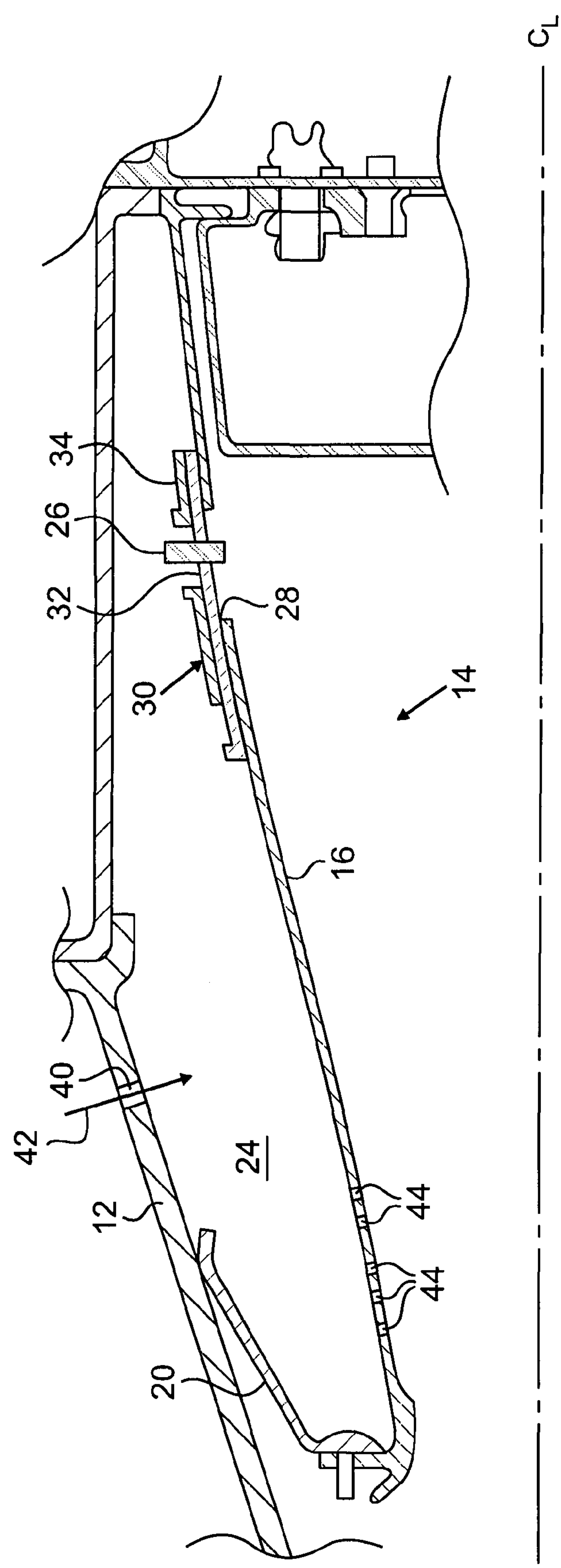
FIG. 2 is an enlarged cross-sectional view of a forward outer diameter ring plenum of a turbine exhaust case assembly of the aft section of the gas turbine engine.

FIG. 2 is an enlarged cross-sectional view of a portion of the TEC assembly 14 shown in FIG. 1. As shown in FIG. 2, a FODR plenum 24 is defined, at least in part, by the LPT case 12, the FODR 16 and the finger seal 20. The FODR plenum 24 forms a generally annularly shaped cavity located at an outer margin of the hot gas flowpath of the engine.

Figure 3:
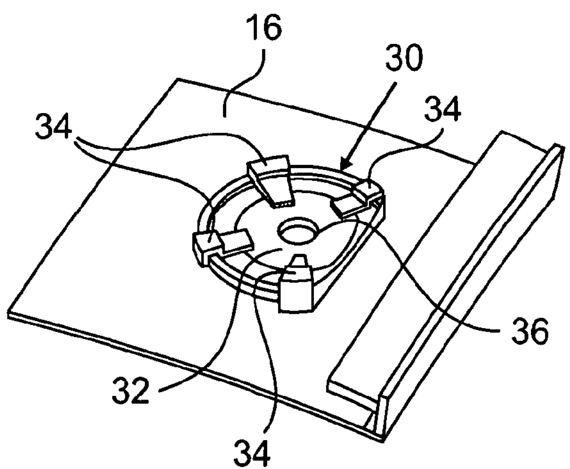
FIG. 3 is a perspective view of a portion of a forward outer diameter ring and a boss assembly of the turbine exhaust case assembly.

A probe (or sensor) 26 is exposed to the hot gas flowpath at an opening 28 in a generally aft (or downstream) region of the FODR 16. The probe 26 is supported at a conventional boss assembly 30, which includes a "slider" plate seal 32 retained by tabs 34, for sealing a gap between the probe 26 and edges of the opening 28. FIG. 3 is a perspective view of a portion of the FODR 16 and the boss assembly 30 showing a radially outward surface of the FODR 16. As shown in FIG. 3, the slider plate seal 32 has a opening 36 formed therein to seal around the probe 26, yet still allow the probe 26 to be exposed to the hot gas flowpath. The probe 26 can be of nearly any known type for collecting data relevant to gas turbine engine operation. For example, the probe 26 can be an exhaust gas temperature (EGT) probe, a pressure sensing probe, or other type of probe. In some embodiments, a plurality of probes, which can be of the same type or of different types, can be circumferentially spaced about the FODR 16. For instance, additional probes can be installed in test engines for gathering additional data, while those additional probes may be omitted in engines intended for regular use.

Because the FODR 16 and the FODR plenum 24 are exposed to or in close proximity to the hot gas flowpath, both are subject to heating during engine operation. Such heating is traditionally especially problematic at the boss assembly 30 where the probe 26 is supported because of the divergent shape of the TEC assembly 14. That divergent shape causes hot gases in the hot gas flowpath to decelerate and increase pressure, which can present hot gas stagnation and recirculation problems in that area that further contribute to undesired heating of nearby engine components. It is effectively impossible to move the boss assembly 30 and the probe 26 upstream to a more forward region of the FODR 16 of the TEC assembly 14, because access within the engine for installing and maintaining those components (typically from radially outward locations) is only available at the aft region of the FODR 16. However, according to the present invention, cooling is provided relative to the FODR plenum 24 in order to limit thermal damage and undesired thermal gradients. Furthermore, the cooling process pressurizes the FODR plenum 24, which helps reduce undesired hot gas inflow.

Turning again to FIG. 2, the LPT case 12 includes a number of cooling fluid inlet openings 40 that connect the FODR plenum 24 to a cooling fluid supply region in the LPT case (not shown in its entirety). The cooling fluid can be bleed air from a relatively low temperature section of the engine, such as a compressor or fan section, and that bleed air can be collected and routed to the LPT case 12 in a conventional manner. The inlet openings 40 can be circumferentially spaced and arranged in a single row, as shown in FIGS. 1 and 2, or arranged in multiple rows, with or without clocking between adjacent rows, in alternative embodiments. Pressure of the cooling fluid can be approximately twice that of a forward or upstream portion of the FODR plenum 24 in order to produce suitable flows 42 of cooling fluid through the inlet openings 40 into the FODR plenum 24, which will typically produce sonic (unity Mach number) cooling jets into the FODR plenum 24. However, those skilled in the art will recognize that the particular pressure ratios can vary for particular applications.

Cooling fluid introduced into the FODR plenum 24 can be exhausted from the FODR plenum 24 into the hot gas flowpath through one or more film cooling openings 44 defined through the FODR 16. The film cooling openings 44 provide film cooling along a radially inner surface of the FODR 16, in order to help protect the FODR 16 from accepting thermal energy present in the hot gas flowpath. It should be noted that the number and size of the film cooling openings 44 should be selected such that a desired pressure ratio between the FODR plenum 24 and the hot gas flowpath is maintained, in order to reduce a risk of hot gas inflow to the FODR plenum 24. The film cooling openings 44 can be located in a generally upstream or forward region of the FODR 16, and can be circumferentially spaced and arranged in a number of rows, with or without clocking between adjacent rows, as desired for particular applications. Greater film cooling effectiveness is generally provided where the film cooling openings 44 are located in a forward region of the FODR 16 rather than an aft region closer to the boss assembly 30 and the probe 26, because openings formed further aft (or downstream) pose a significant risk of undesired hot gas inflow due to the divergent shape of the TEC assembly 14 across the FODR 16. This may appear counter-intuitive, but is the optimal result of a trade-off between a desire to provide effective film cooling across substantially the entire FODR 16 and the risk of undesired hot gas inflow.

Figure 4:
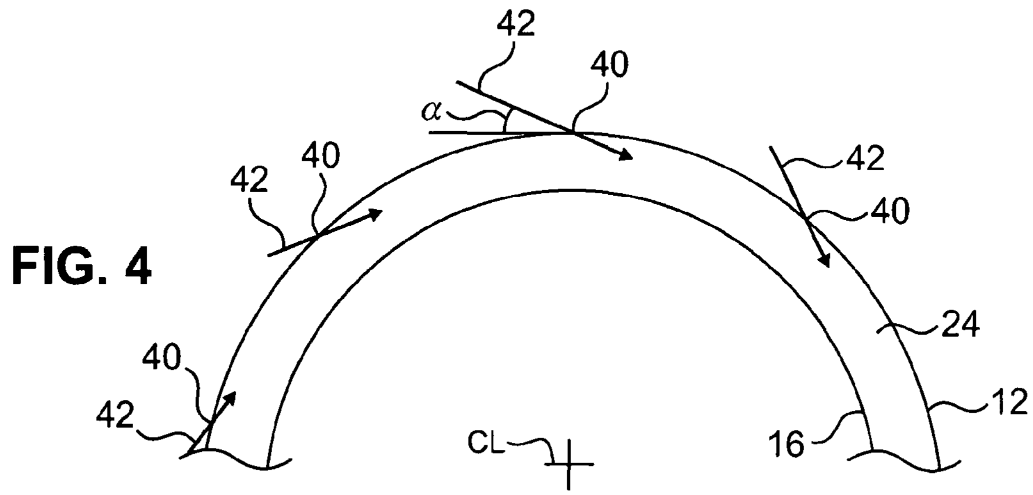
FIG. 4 is a schematic cross-sectional view of the forward outer diameter ring plenum.

FIG. 4 is a schematic cross-sectional view of the FODR plenum 24 (taken perpendicular to the cross-sections shown in FIGS. 1 and 2), showing an exemplary manner for delivering cooling fluid. In the illustrated embodiment, the cooling fluid flows 42 are delivered at an angle $\alpha$ relative to the LPT case 12, that is, relative to a line tangent to the LPT case 12 at a location adjacent to a corresponding inlet opening 40. The angle $\alpha$ can be defined in a generally circumferential direction with respect to the LPT case 12, although other arrangements are possible. Moreover, the angle $\alpha$ at which the cooling fluid flows 42 are delivered through the inlet openings 40 to the FODR plenum 24 can vary between approximately 0-180° as desired for particular applications. In some embodiments, the angle $\alpha$ is between approximately 15-60°. It is generally desirable to circulate the cooling fluid within the FODR plenum 24 in order to enhance cooling and reduce thermal gradients. It is further generally desirable to limit or avoid direct impingement of cooling fluid flows 42 upon a radially outward surface of the FODR 16 inside the FODR plenum 24. Direct impingement can produce rather relatively large and undesirable thermal gradients in components bordering the FODR plenum 24, especially the FODR 16. The particular value and arrangement of the angle $\alpha$ can be selected such that direct impingement upon the FODR 16 by the cooling fluid flows 42 is reduced or avoided, while simultaneously providing suitable circulation of the cooling fluid within the FODR plenum 24.

The angle $\alpha$ at which the cooling fluid flows 42 are delivered can be determined by defining the inlet openings 40 in the LPT case 12 at the angle $\alpha$. Alternatively, additional structures can be optionally provided to deliver the cooling fluid flows 42 at a desired orientation.

Figure 5:
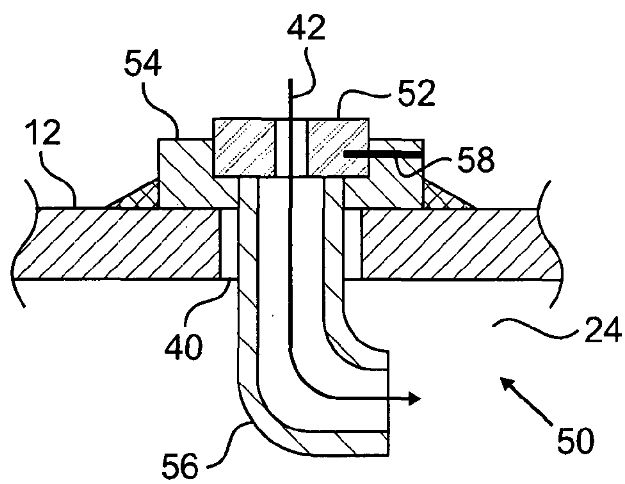
FIG. 5 is a cross-sectional view of a cooling sleeve assembly according to the present invention.

FIG. 5 is a cross-sectional view of an optional cooling sleeve assembly 50 mounted at an inlet opening 40 in the LPT case 12. The illustrated cooling sleeve assembly 50 includes a control orifice 52, a support piece 54, a sleeve 56, and a pin 58. The support piece 54 is attached to the LPT case 12 by welding, brazing or the like. The control orifice 52 is secured to the support piece 54 with the pin 54, and allows adjustable throttling of cooling fluid flow 42 to desired pressure and flow rates. The sleeve 56 is operative connected to the control orifice 52 and extends through the inlet opening 40 in the LPT case 12. The sleeve 56 can have a bend in order to change a direction of the cooling fluid flow 42 as desired. In the illustrated embodiment, the sleeve 56 is bent at an angle such that the cooling fluid flow 42 changes direction within the sleeve 56 and is delivered to the FODR plenum 24 substantially tangential to a radially inner surface of the LPT case 12, which helps prevent impingement of cooling fluid upon the FODR 16 (not shown in FIG. 5). The sleeve 56 can further be arranged such that the cooling fluid flows 42 is delivered in a generally circumferential direction relative to the LPT case 12, in order to circulate cooling fluid within the FODR plenum 24 and to further reduce the risk of impingement of cooling fluid upon the FODR 16.

Although the present invention has been described with reference to preferred embodiments, workers skilled in the art will recognize that changes may be made in form and detail without departing from the spirit and scope of the invention.

What is claimed is:

1. A cooled turbine exhaust case assembly located adjacent to a low pressure turbine section, the assembly comprising:

a plenum defined at least in part by a forward outer diameter flowpath ring and a turbine case, wherein the forward outer diameter flowpath ring is located aft of the low pressure turbine section;

a probe positioned at a probe opening formed in the forward outer diameter flowpath ring; and an inlet opening in the turbine case for introducing cooling air to the plenum.

2. The assembly of claim 1 and further comprising:

one or more film cooling openings defined in the forward outer diameter flowpath ring for allowing cooling air to exit the plenum to a hot gas flowpath to provide film cooling to the forward outer diameter flowpath ring.

3. The assembly of claim 2, wherein the film cooling openings defined in the forward outer diameter flowpath ring are located in a region that is upstream and spaced from the probe opening.

4. The assembly of claim 1 and further comprising:

a slider seal secured at the probe opening by tab structures to provide sealing between the probe and the forward outer diameter flowpath ring.

5. The assembly of claim 1, wherein the probe comprises an exhaust gas temperature probe.

6. The assembly of claim 1, wherein the inlet opening in the turbine case introduces cooling air to the plenum at a first angle relative to an adjacent surface of the turbine case, and wherein the first angle is about 15° to about 60°.

7. The assembly of claim 6, wherein the first angle is defined in a generally circumferential direction with respect to the turbine case.

8. The assembly of claim 1, wherein the inlet opening in the turbine case introduces cooling air to the plenum at an angle such that cooling air is not directly impinged upon the forward outer diameter flowpath ring.

9. The assembly of claim 1 and further comprising:

a cooling air delivery tube secured at the inlet opening in the turbine case, wherein the cooling air delivery tube is bent to deliver cooling air to the plenum at an angle relative to the turbine case.

10. The assembly of claim 9, wherein the angle at which the cooling air delivery tube introduces cooling air to the plenum is such that cooling air is not directly impinged upon the forward outer diameter flowpath ring.

11. The assembly of claim 9, wherein the cooling air delivery tube is bent to deliver cooling air to the plenum substantially tangential to an adjacent surface of the turbine case.

12. The assembly of claim 9 and further comprising:

a control orifice for throttling cooling air flow through the cooling air delivery tube to the plenum.

13. The assembly of claim 12 and further comprising:

a pin for securing the control orifice relative to the inlet opening.

14. The assembly of claim 1, wherein the forward outer diameter flowpath ring has a divergent shape.

15. The assembly of claim 1, wherein the turbine case comprises a low pressure turbine case.

16. A cooled turbine exhaust case assembly for a gas turbine engine, the assembly comprising:

a forward outer diameter flowpath ring;

a low pressure turbine case located generally radially outward of the forward outer diameter flowpath ring;

a plenum defined at least in part by the forward outer diameter flowpath ring and the low pressure turbine case;

an inlet opening in the low pressure turbine case for introducing cooling air to the plenum; and one or more film cooling openings defined in an upstream region of the forward outer diameter flowpath ring for allowing cooling air to exit the plenum to a hot gas flowpath of the gas turbine engine to provide film cooling to the forward outer diameter flowpath ring.

17. The assembly of claim 16, wherein the inlet opening in the low pressure turbine case introduces cooling air to the plenum at a first angle relative to an adjacent surface of the low pressure turbine case, and wherein the first angle is about 15° to about 60°.

18. The assembly of claim 16, wherein the inlet opening in the low pressure turbine case introduces cooling air to the plenum at an angle such that cooling air is not directly impinged upon the forward outer diameter flowpath ring.

19. The assembly of claim 16 and further comprising:

a cooling air delivery tube secured to the low pressure turbine case at the inlet opening, wherein the cooling air delivery tube is bent to deliver cooling air to the plenum at an angle relative to the low pressure turbine case.

20. The assembly of claim 19, wherein the angle at which the cooling air delivery tube introduces cooling air to the plenum is such that cooling air is not directly impinged upon the forward outer diameter flowpath ring.

21. The assembly of claim 19, wherein the cooling air delivery tube is bent to deliver cooling air to the plenum substantially tangential to an adjacent surface of the low pressure turbine case.

22. The assembly of claim 19 and further comprising:

a control orifice for throttling cooling air flow through the cooling air delivery tube to the plenum.

23. The assembly of claim 16 and further comprising:

a probe positioned at a probe opening formed in the forward outer diameter flowpath ring.

24. A method for cooling a turbine exhaust case assembly for a gas turbine engine, the method comprising:

delivering cooling air to a plenum that is defined at least in part by a forward outer diameter flowpath ring and a turbine case, wherein the cooling air is delivered so as to substantially avoid directly impinging the forward outer diameter flowpath ring; and exhausting the cooling air from the plenum to a hot gas flowpath of the gas turbine engine for providing film cooling.

25. The method of claim 24, wherein the cooling air is delivered in a direction that is substantially tangential to an inner surface of the turbine case.

26. The method of claim 24 and further comprising:

sensing a parameter associated with the hot gas flowpath using a probe.

* * * * *